United States Patent [19]

Boden et al.

[11] Patent Number: 5,274,068
[45] Date of Patent: Dec. 28, 1993

[54] CATALYTIC, INTERFACIAL, PH CONTROLLED PREPARATION OF POLYESTER POLYCARBONATE

[75] Inventors: Eugene P. Boden, Scotia; Peter D. Phelps, Schenectady, both of N.Y.

[73] Assignee: General Electric Company, Schenectady, N.Y.

[21] Appl. No.: 872,372

[22] Filed: Apr. 23, 1992

[51] Int. Cl.⁵ .............................................. C08G 63/64
[52] U.S. Cl. ...................... 528/179; 528/176; 528/182
[58] Field of Search .................. 528/179, 182, 176

[56] References Cited

U.S. PATENT DOCUMENTS

| | | |
|---|---|---|
| 3,169,121 | 2/1965 | Goldberg . |
| 4,238,596 | 12/1980 | Quinn . |
| 4,238,597 | 12/1980 | Markezich et al. . |
| 4,280,683 | 7/1981 | Knierim .................. 254/117 |
| 4,286,083 | 8/1981 | Kochanowski ............ 528/173 |
| 4,628,081 | 12/1986 | Mark et al. . |
| 4,677,183 | 6/1987 | Mark et al. . |
| 4,983,706 | 1/1991 | Fontana et al. ........... 528/179 |
| 5,015,720 | 5/1991 | Boden et al. ............. 528/179 |
| 5,025,081 | 6/1991 | Fontana et al. .......... 528/182 |

*Primary Examiner*—Harold D. Anderson
*Attorney, Agent, or Firm*—William H. Pittman

[57] ABSTRACT

Polycarbonates are prepared from dihydric phenols, carbonate precursors, an aliphatic dicarboxylic acid having from 4 to 8 carbon atoms, and a catalyst selected from the group consisting of phase transfer catalysts and trialkylamines, wherein the initial pH is maintained from 3 to 8 until 40 to 90 percent of the total amount of carbonate precursor is added, and the pH is then raised to 10–12 until the reaction is complete.

7 Claims, No Drawings

CATALYTIC, INTERFACIAL, PH CONTROLLED PREPARATION OF POLYESTER POLYCARBONATE

BACKGROUND OF THE INVENTION

Polycarbonates are well known as tough, clear, highly impact resistant thermoplastic resins. However, these polycarbonates also possess a relatively high melt viscosity. Therefore, in order to prepare a molded article from polycarbonate, relatively high extrusion and molding temperatures are required. Various efforts throughout the years to reduce the melt viscosity while also maintaining the desired physical properties of the polycarbonates have been attempted. These methods include the use of plasticizers, the use of aliphatic chain stoppers, reduction of molecular weight, the preparation of bisphenols having long chain aliphatic substituents and various polycarbonate copolymers as well as blends of polycarbonate with other polymers.

With respect to plasticizers, these are generally used with thermoplastics to achieve higher melt flow. However, usually accompanying the plasticizer incorporation into polycarbonate compositions are undesirable features such as embrittlement and fugitive characteristics of the plasticizer.

Increased flow can be fairly readily obtained with the use of aliphatic chain stoppers, however, impact resistance as measured by notched Izod drops significantly. Embrittlement may also be a problem.

When utilizing a bisphenol having a lengthy aliphatic chain thereon, increases in flow can be observed. However, these are usually accompanied by substantial decrease in the desirable property of impact strength.

Various processes have been utilized to prepare polycarbonates with increased processability. When utilizing a copolyestercarbonate with an aliphatic segment, processes such as the pyridine solvent process of U.S. Pat. No. 3,169,121, have been utilized as well as processes utilizing diacid halides in an interfacial process sequence such as disclosed in U.S. Pat. No. 4,238,596 and U.S. Pat. No. 4,238,597. Additionally, high molecular weight aliphatic segments have been introduced into the polycarbonate (by interfacial methods) utilizing dicarboxylic endcapped polyisobutylene segments, see Mark and Peters U.S. Pat. No. 4,677,183 and U.S. Pat. No. 4,628,081. Additionally, a method of incorporating aliphatic dicarboxylic acids into polycarbonate is disclosed in Kochanowski, U.S. Pat. No. 4,286,083 wherein in an interfacial process the diacids are reacted together with a dihydric phenol and a carbonate precursor such as phosgene.

Although a standard interfacial process utilizing the chloride derivative of the saturated aliphatic alpha omega diacids can be employed to prepare the copolyestercarbonate, the availability of the diacid chloride starting materials is a problem. Aliphatic diacid chlorides are commerically available only in limited quantities and at a very high cost. Furthermore, even high purity diacid chlorides contain color contaminants which cause the final molded parts to display an unattractively high yellowness index. Therefore, attention was focused on the readily available, relatively inexpensive diacid starting materials. The previously mentioned Kochanowski patent was studied. The disclosure is directed to the usage of various aliphatic dibasic acids as disclosed at column 5, lines 13 through 22 in combination with a dihydric phenol and a carbonate precursor such as phosgene in an interfacial process. According to Kochanowski at column 6, lines 24 through 31, the reaction was carried out at a pH of between about 4.5 and 8.5, preferably between about 5.5 and 6.5 until the dibasic acid is consumed. The pH of the reaction is then raised to a value of between 9 and 11.5 to complete the reaction. The polyestercarbonate is isolated according to standard techniques, see column 6, lines 24 through 30 of Kochanowski. Experiments which followed the Kochanowski disclosure were conducted, Fontana et al., U.S. Pat. No. 5,025,081. 50% of adipic acid (10 mole percent) was incorporated into the polycarbonate backbone and yielded a 5 mole percent copolyestercarbonate. The preferred pH range disclosed in Kochanowski does not bring about complete incorporation of diacids into copolyestercarbonates in a reasonable time period. According to U.S. Pat. Nos. 4,286,083 and 4,983,706, it is possible to incorporate high molecular weight ($C_{8-20}$) into polycarbonates. Lower molecular weight acids, such as adipic acid, are generally less expensive than the higher molecular weight acids, hence it is desirable to incorporate these lower molecular weight acids into polycarbonates.

A new process has been discovered which produces a reduced $T_g$ polyester polycarbonate derived from aliphatic dicarboxylic acids having from 4 to 8 carbon atoms. In order to obtain this reduced $T_g$ polyester polycarbonate, a stepwise pH range is followed in which the initial pH range is from 3 to 8, followed by raising the pH to a range of from 10 to 12 in subsequent stages. More specifically, low $T_g$ polyester polycarbonates can be made from low cost adipic acid, in a method using relatively short reaction times, for example, less than 1½ hour.

SUMMARY OF THE INVENTION

The present invention relates to a method for producing a copolyestercarbonate which comprises reacting interfacially a dihydric phenol, a carbonate precursor, an aliphatic dicarboxylic acid having from 4 to 8 carbon atoms, and a catalyst selected from the group consisting of phase transfer catalysts and trialkylamines; maintaining the initial pH at 3-8 until 40-90% of the total amount of carbonate precursor is added; and raising the pH to 10-12 until the reaction is complete.

Additionally, the present invention relates to a copolyestercarbonate comprising structural units of the formula:

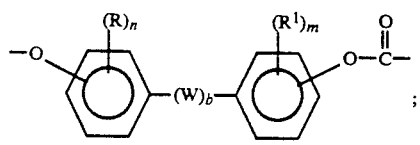

and

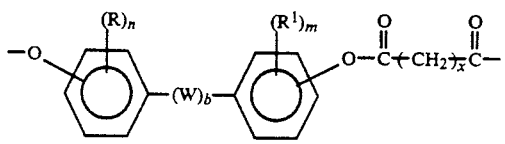

wherein R is independently selected from halogen, monovalent hydrocarbon, and monovalent radicals; $R^1$ is independently selected from halogen, monovalent hydrocarbon, and monovalent radicals; W is selected from divalent hydrocarbon radicals,

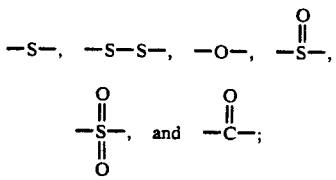

n and m are independently selected from integers having a value of from 0-4 inclusive; and b is 0 or 1; and x is 2-6.

DETAILED DESCRIPTION OF THE INVENTION

It is desirable to form copolyestercarbonates possessing lower melt viscosities, as evidenced by lower glass transition temperatures, by methods using relatively inexpensive, lower molecular weight dicarboxylic acids or their derivatives such as adipic acid, with phosgene. The copolyestercarbonates of the current invention generally have $T_g$ less than 150° C., and preferably about 130° C. or less.

The copolyestercarbonates are prepared from dihydric phenol and carbonate precursors. Illustrative dihydric phenols can be represented by the following formula:

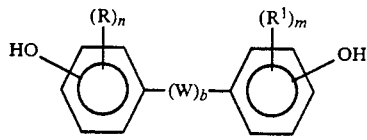

wherein R is independently selected from halogen, monovalent hydrocarbon, and monovalent hydrocarbonoxy radicals; $R^1$ is independently selected from halogen, monovalent hydrocarbon, and monovalent hydrocarbonoxy radicals; W is selected from divalent hydrocarbon radicals,

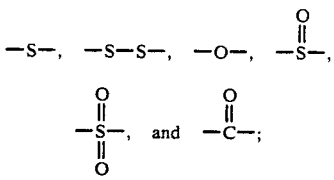

n and m are independently selected from integers having a value of from 0-4 inclusive; and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to about 12 ring carbon atoms, such as phenyl, naphthyl, and biphenyl. The preferred alkaryl and aralkyl radicals are those containing from 7 to about 14 carbon atoms. Preferably, the hydroxy groups are located in the para position on the rings.

The preferred halogen radicals represented by R and $R^1$ are chlorine and bromine.

The divalent hydrocarbon radicals represented by W include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by R and $R^1$ may be represented by the formula —$OR^2$ wherein $R^2$ is a monovalent hydrocarbon radical of the type described previously. Preferred monovalent hydrocarbonoxy radicals are the alkoxy and aryloxy radicals.

Some illustrative non-limiting examples of the dihydric phenols falling within the scope of the Formula include:
2,2-bis(4-hydroxyphenyl)propane(bisphenol A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4-dihydroxydiphenyl ether;
4,4-thiodiphenol;
4,4-dihydroxy-3,3-dichlorodiphenyl ether; and
4,4-dihydroxy-3,3-dihydroxydiphenyl ether.

Other useful dihydric phenols which are also suitable for use in the preparation of the above polycarbonates are disclosed in U.S. Pat. Nos. 2,999,835; 3,028,365; 3,334,154; and 4,131,575, all of which are incorporated herein by reference.

The carbonate precursor utilized in the invention can be any of the standard carbonate precursors used in the interfacial reaction such as phosgene, and the like. When using the interfacial process it is also standard practice to use a catalyst system well known in the synthesis of polycarbonates and copolyestercarbonates.

Suitable catalysts include the tertiary amines. Tertiary amines include aliphatic amines such as triethylamine, tri-n-propylamine, diethyl-n-propylamine, and tri-n-butylamine, and highly nucleophilic heterocyclic amines such as 4-dimethylaminopyridine. Such amines generally contain at least about 6 and preferably about 6-14 carbon atoms. The most useful amines are trialkylamines containing no branching on the carbon atoms in the 1- and 2-positions. Triethylamine is the most preferred.

In an alternative embodiment, a phase transfer catalyst system may also be used. Examples of phase transfer catalyst systems include ammonium salts, phosphonium salts, hexaalkyl guanidinium halides, and crown ethers. Preferred is $C_6H_5CH_2N^+Me_3Cl^-$.

A chain terminating agent to control the molecular weight of the polymers is usually present. Suitable chain termination agents are those commonly employed for polycarbonate formation, including monohydroxyaromatic compounds such as phenol, p-t-butylphenol and p-cumylphenol. Phenol is preferred. Quantities of chain terminating agents can range from about 0.5 to about 7 mole percent based on the amount of dihydric phenol.

The monomer which supplies the aliphatic ester units in the copolyestercarbonate is an aliphatic diacid having from 4 to 8 carbon atoms, and preferably 6 carbon atoms. The aliphatic system can be normal, branched or cyclic. Specific examples include adipic acid, and any diacid with a pka in the range of 4-5, known to the art. Adipic acid is preferred and is generally used in the amount of from about 2 to about 30 mole percent of the dihydric phenol reactant, and more preferably from about 5 to about 25 mole percent.

The stepwise pH range is critical to the process. Generally, the pH range of from 3 to 8, and preferably between 4.2 and 4.5 is maintained until about 40-90 percent of the total amount of carbonate precursor has been added. This addition usually results in at least 90 percent adipic acid being consumed. Preferably, the pH is maintained at about 3.5-5.5 until 50-80 percent of the carbonate precursor is added. Following this addition, the pH is raised to a level of about 10 to about 12 wherein the remainder of the reaction is carried out.

The preferred carbonate precursor is phosgene, and for simplicity the reaction will be referred to as a phosgenation. One aspect of this invention is that the reaction time for the entire phosgenation to occur is less than 1.5 hours and preferably less than 30 minutes, resulting in a more efficient process.

The process is carried out by standard techniques well known in the art. For example, the aliphatic diacid is charged to the reactor or can be added in the form of the dicarboxylate salt, with the particular dihydric phenol being employed, preferably bisphenol A. The chain terminating agent can be added now or later. The reactor can already have the organic solvent, preferably methylene chloride, or it can be added at this time. Following these various options of addition, the carbonate precursor, preferably phosgene, is then added together with the aqueous sodium hydroxide to maintain the desired pH.

The following are examples that are not intended to narrow the general scope of the invention.

EXAMPLE 1

Various conditions were tested to determine the optimal conditions for incorporating adipic acid (see Table I). 19.4 g Bisphenol A (85 mmol), 0.282 g of phenol (3.00 mmol), 150 mL of $CH_2Cl_2$, (1 mmol) of catalyst (0.186 g $C_6H_5CH_2N^+Me_3Cl^-$), 2.19 g (15 mmol) of adipic acid, and 50 mL of deionized water were added to a 500 mL, 5 neck Morton flask equipped with a mechanical stirrer, condenser, pH electrode, caustic addition port, and a phosgene dip tube. Phosgene was added at 0.65 g/min for 15.4 minutes (approximately 100 mmol) while the pH was held at 4-4.4. The pH was then adjusted to approximately 10.5, and the phosgene addition was continued until the reaction became thick and produced a characteristic gray color indicating complete polymerization. The reaction was then transferred to a 1000 mL separatory funnel and the brine separated. The organic phase was washed with 500 mL of 1N HCl, 500 mL of deionized water, then added to 600 mL methanol in a blender to precipitate the polymer. The isolated polymer was washed with 500 mL methanol and with 500 mL water prior to being dried under high vacuum.

The major resonances associated with the $^1H$ NMR of the adipoyl based polyester polycarbonate were: 1.68 (s, 6H) for the gem dimethyl protons, 2.61 (broad t, J=5.2, 4H) for the alpha methylene protons of adipolyl segments, and 6.99 (d, J=4.1, 4H) for the ortho aromatic protons adjacent to the ester linkages. The mole percentage of soft segment component in the polymers using a correction of 3 percent for the phenol chain stopper was determined by finding the ratio of the area of the methylene protons alpha to the carbonyl (2.61 ppm) divided by the area of aromatic protons.

TABLE 1

| | Comparison of Conditions for Incorporating Adipic Acid Using $C_6H_5CH_2NMe_3Cl$ Catalyst | | | | |
|---|---|---|---|---|---|
| Reaction | Catalyst | 1st pH (min) | 2nd pH (min) | % Incorp | Comments |
| 1 | $C_6H_5CH_2NMe_3Cl$ | 8(10) | 10.5(10) | 20% | Catalyst |
| 2 | $C_6H_5CH_2NMe_3Cl$ | 4-4.4(5) | 10.5(15) | 19% | added |
| 3 | $C_6H_5CH_2NMe_3Cl$ | 4-4.4(10) | 10.5(10) | 71% | during 2nd |
| 4 | $C_6H_5CH_2NMe_3Cl$ | 4-4.4(15) | 10.5(5) | 96% | pH step |
| 5 | $C_6H_5CH_2NMe_3Cl$ | 3(15) | 10.5(5) | 17% | |
| 6 | $C_6H_5CH_2NMe_3Cl$ | 4-4.4(15.4) | 10.5(13) | 99% | |
| 7 | $C_6H_5CH_2NMe_3Cl$ | 4-4.4(15) | 10.5(17) | 17% | |

EXAMPLE 2

Various conditions were tested to determine the optimal conditions for incorporating adipic acid using $Et_3N$ as the catalyst. The amount of reagents added was the same as in Example 1 except that 0.14 mL of triethylamine was used instead of the phase transfer catalyst $C_6H_5CH_2NMe_3Cl$. The results are given in Table 2.

TABLE 2

| | Comparison of Conditions for Incorporating Adipic Acid Using $Et_3N$ Catalyst | | | |
|---|---|---|---|---|
| Reaction | Catalyst | 1st pH (min) | 2nd pH (min) | % Incorp |
| 1 | $Et_3N$ | 8(10) | 10.5(10) | 14% |
| 2 | $Et_3N$ | 4-4.4(10) | 10.5(10) | 83% |
| 3 | $Et_3N$ | 4-4.4(15.4) | 10.5(13) | 99% |

Both Table 1 and Table 2 show it is possible to incorporate about 99% of adipic acid.

What is claimed is:

1. A method for producing a copolyestercarbonate which comprises reacting interfacially a dihydric phenol, a carbonate precursor, an aliphatic dicarboxylic acid having from 4 to 8 carbon atoms, and a catalyst selected from the group consisting of (1) phase transfer catalysts selected from the group consisting of ammonium salts, phosphonium salts, hexaalkyl guanidinium halides and crown ethers, and (2) trialkylamines; maintaining a pH in the range of 3.5-5.5 until 50-80 percent of the total amount of carbonate precursor is added; and raising the pH to about 10-12 until the reaction is complete.

2. A method according to claim 1 wherein said dihydric phenol has the formula

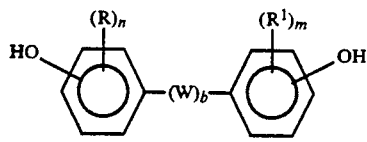

wherein R is independently selected from the group consisting of halogen, monovalent hydrocarbon, and monovalent hydrocarbonoxy radicals; $R^1$ is independently selected from the group consisting of halogen, monovalent hydrocarbon, and monovalent hydrocarbonoxy radicals; W is selected from the group consisting of divalent hydrocarbon radicals,

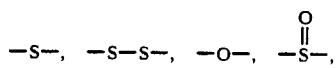

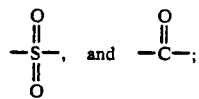

n and m are independently selected from integers having a value of from 0–4 inclusive; and b is zero or one.

3. A method according to claim 2 wherein said dihydric phenol is bisphenol A.

4. A method according to claim 3 wherein said carbonate precursor is phosgene.

5. A method according to claim 4 wherein said aliphatic dicarboxylic acid is adipic acid.

6. A method according to claim 5 wherein the catalyst is $C_6H_5CH_2N^+Me_3Cl^-$.

7. A method according to claim 5 wherein the catalyst is triethylamine.

* * * * *